United States Patent [19]

Wendland et al.

[11] Patent Number: 4,635,114
[45] Date of Patent: Jan. 6, 1987

[54] ADAPTIVE TELEVISION TRANSMISSION SYSTEM

[75] Inventors: Broder Wendland, Waltrop; Hartmut Schroeder, Dortmund, both of Fed. Rep. of Germany

[73] Assignee: Robert Bosch GmbH, Stuttgart, Fed. Rep. of Germany

[21] Appl. No.: 670,143

[22] Filed: Nov. 9, 1984

[30] Foreign Application Priority Data

Nov. 15, 1983 [DE] Fed. Rep. of Germany ....... 3341298

[51] Int. Cl.$^4$ .............................................. H04N 7/01
[52] U.S. Cl. .................... 358/140; 358/105; 358/136
[58] Field of Search .................... 358/140, 136, 105

[56] References Cited

U.S. PATENT DOCUMENTS 1,796,030 3/1931 Kell ........................................ 358/136
4,551,753 11/1985 Nishizawa ............................ 358/140

OTHER PUBLICATIONS

"Fernseh und Kinotechnik" 1980, No. 2, pp. 41-48.
"High Quality Television by Signal Processing", Broder Wendland, (1983).

Primary Examiner—Howard W. Britton
Attorney, Agent, or Firm—Michael J. Striker

[57] ABSTRACT

A high quality TV transmission system is devised including a preprocessing circuit controlled by motion present in the scene to be transmitted. In the absence of motion, processing circuit derives output picture field signals of a standard frequency from a single input picture field scanned at a higher frequency. In the presence of motion, all input picture fields scanned with high number of lines are stored in storing devices and processed by interpolating low pass filters and a multiplexer into output picture fields having the standard frequency but being free of aliansing interference.

4 Claims, 2 Drawing Figures

ADAPTIVE TELEVISION TRANSMISSION SYSTEM

BACKGROUND OF THE INVENTION

The present invention relates in general to a television transmission system and in particular to an adaptive TV transmission system for use in connection with another TV system employing standard number of scanning lines in its video signal.

In German magazine "Fernseh und Kinotechnik" 1980, No. 2, pages 41 through 48, different TV systems have been described in which the resolution and other quality factors of the reproduced pictures are improved in comparison with those in conventional TV transmission systems. If such new systems are to be employed in TV communications, it would be necessary to make them compatible with the existing ones. That means that transmissions produced according to the new methods should be received by established TV receivers withouts impairment of their quality. To achieve this, in the aforementioned publication several methods are devised which however have not yet been reduced to practice on a broader base.

In U.S. patent application Ser. No. 530,073 a high quality TV system which is compatible with existing standard TV systems has been devised in which the scanning of pictures is made progressively, that means without the line interlacing at a double line rate within a half frame or picture field of a standard TV signal so that the duration of a scanning line is only a quarter of the duration of the standard scanning lines. As a consequence, for processing such high quality TV signals, additional expansion circuits are necessary.

SUMMARY OF THE INVENTION

It is therefore a general object of the present invention to avoidthe disadvantages of prior art high quality TV transmission systems.

In particular, it is an object of the invention to provide a high quality TV system which at moderate technological expenses is compatible with existing TV communication system employing standard video signals.

In keeping with these objects and others which will become apparent hereafter, one feature of the invention resides, in an adaptive TV transmission system for use in connection with another TV transmission system employing a standard number of scanning lines for a video signal, in a combination which comprises means for scanning a scene by an interlaced scanning method and at a higher number of lines per picture field (i.e. a half frame) than the standard video signal, signal processing means coupled to the scanning means and including a motion detector controlling the signal processing means so that in the presence of motion in the scene the processing means derives, from picture fields scanned at a higher line number, output picture fields having a line number corresponding to the standard TV signal and, in the absence of motion in the scene, the processing means derives from a single picture field scanned at a higher light number, output picture fields having a line number corresponding to the standard TV signal.

Preferably, the signal processing means includes one branch for preprocessing substantially motionless pictures and another branch for preprocessing moving pictures, the motion detector controlling the processing circuit in such a way that in the presence of motion in the scene, the other branch processes input picture fields having higher line number into output picture fields of the standard line number but being free of field aliasing and of moving blurr, and in the absence of motion the one branch processes output picture fields at the standard line number and being derived from the first picture field and at the higher line number.

The system of this invention has the advantage that by using a high resolution TV camera scanning for example with 1,249 lines with 2:1 interlace (50 picture fields per second) it is possible to produce without larger manufacturing costs a motion controlled error free scanning for still pictures with high spatial resolution and, for moving scenes, a scanning at a lower spatial resolution, but without any moving blurr, and simultaneously adapt the preprocessed video signals for transmission via conventional transmission channels for standard video signals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE REFERRED EMBODIMENT

Figure 1:
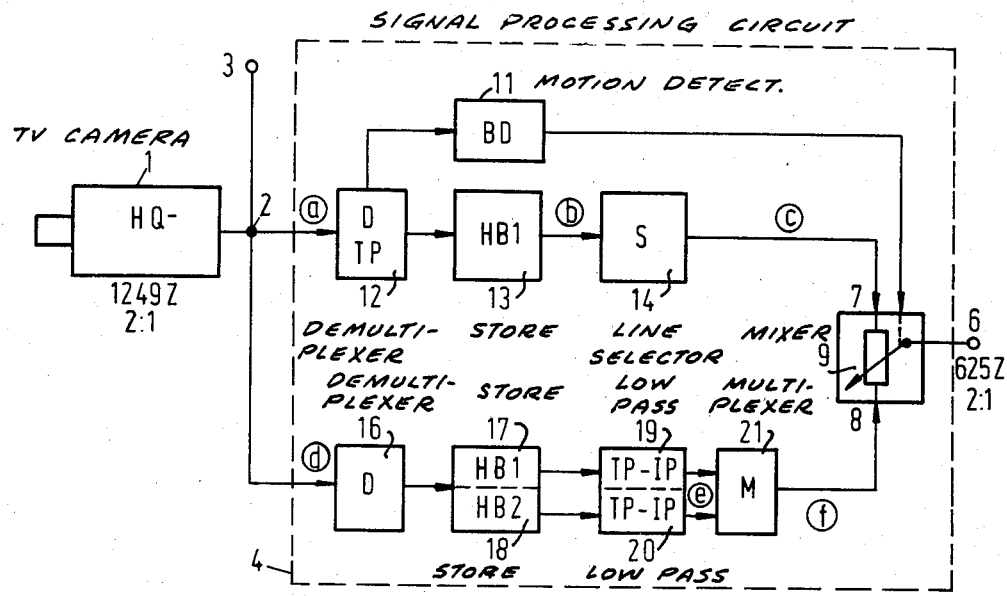
FIG. 1 is a block circuit diagram of the TV transmission system of this invention.

In FIG. 1, a high resolution TV camera 1 operates with a high number scanning lines by means of line interlace scanning method. For example, TV camera 1 scans the scene to be transmitted with 1249 lines, 2:1 interlace at 50 Hertz frequency of 50 picture fields. A corresponding broad band video signal is delivered at the output 2 of the video camera 1 which is delivered to a wide band TV transmission channel 3 and at the same time to a signal processing circuit 4 which according to this invention delivers at its output 6 a video signal which is compatible with a standard video signal and can be transmitted and received on conventional TV broadcasting channels.

The signal processing circuit 4 consists of two signal preprocessing branches of which the upper one is for processing pictures having no or a very slow motion, and the lower branch processes pictures with moving scenes. The outputs of respective preprocessing branches are connected to inputs 7 and 8 of a mixer 9 which is controlled in dependency on the presence or absence of motion in the scene to be transmitted.

In order to determine whether the scanned scene depicts motion or not, a motion detector 11 derives a motion signal from two consecutive pictures scanned by the camera 1. The construction of motion detectors of this kind is sufficiently known from prior art and need not be described in detail in context with this invention. When a motion signal is applied from the detector 11 to the mixer 9, the signals from input 7 are mixed or superposed to signals from input 8 of the mixer whereby the degree of mixing depends on the speed of the detected motion in the picture to be transmitted. In the case of a very slow motion, the corresponding picture can be considered as a still picture.

Figure 2:
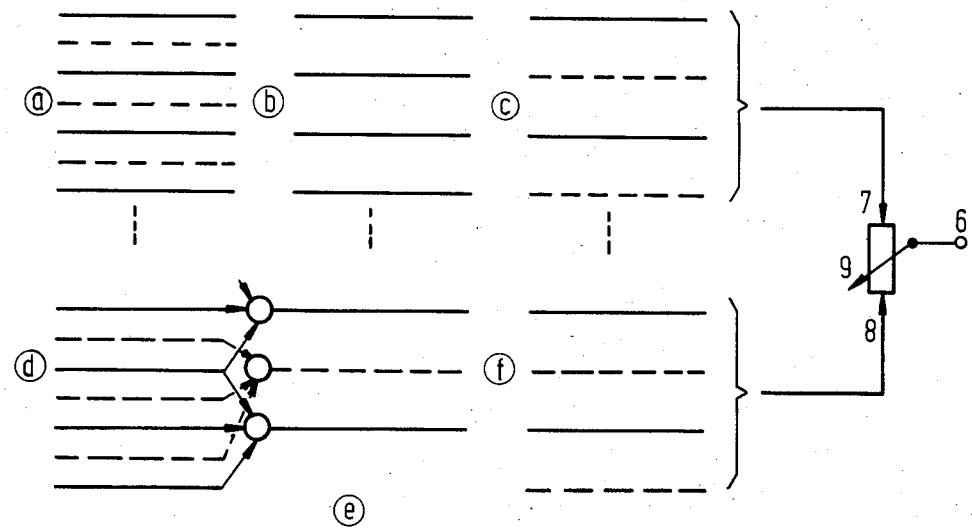
FIG. 2 is a diagram showing schematically signal preprocessing in the device of FIG. 1.

When a still or motionless scene is scanned by the camera 1, the output signal from the camera is preprocessed in the upper branch of the signal processing circuit 4, in which it is first supplied to a demultiplexer 12 provided with a planar low pass filter at its input. Accordingly the demultiplexer receives input fields (or half frames) each having 625 lines (FIG. 2A) without aliasing for still pictures or for very slow moving pictures. Lines of each first picture field (FIG. 2B) from the output of demultiplexer 12 are stored in a store 13 from which in the course of interlaced scanning are read out by means of a line selector 14 (FIG. 2C). In this manner, the odd lines of the first scanned picture field produce the odd lines of the first picture field to be transmitted and the even (dashed) lines of the scanned first field result in the even lines of the second field to be transmitted. In this manner a video signal at 325 lines is supplied to the input 7 during the 2:1 interlace scanning and 50 Hertz field change frequency.

At the lower branch for preprocessing moving picture also includes as a first stage a demultiplexer 16 by means of which the scanning lines of respective fields of each picture frame are separated and supplied to corresponding storing devices 17 and 18. The line signals of stored picture fields (FIG. 2D) are applied to interpolating low pass filters 19 and 20 in which by a weighted interpolation of the 625 lines of each picture field 312 lines of every output field to be transmitted are produced (FIG. 2E). By means of this interpolating low pass filtering any field aliasing interferences or moving picture blurr are practically eliminated. A multiplexer 21 connected to the outputs of respective interpolating low pass filter 19 the output, interference 3 picture field signals are applied to input 8 of mixer 9 (FIG. 2F).

Due to the fact that in line interlace scanning technique most interfering effects are caused by aliasing in video signals representing moving scenes, the TV transmission system of this invention presents a concept for creating synthetic output fields out of one high resolution input field which reliably avoids such interferences without necessitating larger technological expenditures.

It will be understood that each of the elements described above, or two or more together, may also find a useful application in other types of constructions differing from the types described above.

While the invention has been illustrated and described as embodied in a specific example of a TV communication system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A television transmission system for use in connection with another TV transmission system operating with a standard number of scanning lines per video frame, comprising means for scanning a scene by a line interlace scanning technique at a higher line number than that of the standard video frame, signal processing means coupled to said scanning means and including a motion detector for detecting motion in the picture to be transmitted, said processing means producing, in the presence of scene motion from picture fields scanned at high line number, output picture fields having a line number corresponding to the standard video signal, and in the absence of the scene motion, producing from a single picture field scanned with a high line number, output picture fields having a line number corresponding to the standard video signal.

2. A television transmission system as defined in claim 1, wherein said signal processing means includes one branch coupled to said scanning means for preprocessing, in the presence of scene motion, input picture fields scanned at higher line number into output picture fields of the standard line number but being free of field aliasing and moving blurr, and another preprocessing branch coupled to said scanning means for processing the first field scanned at a high line number into output picture fields having the standard line numbers.

3. A television transmission system as defined in claim 2, wherein said one preprocessing branch includes interpolating low pass planar filters for producing the output fields at the standard line number.

4. A television transmission system for use in connection with another TV transmission system operating with a standard number of scanning lines per video frame, comprising means for scanning a scene by a line interlace scanning technique at a higher line number than that of the standard video frame, signal processing means coupled to said scanning means and including a motion detector for detecting motion in the picture to be transmitted, said processing means producing, in the presence of the scene motion, from picture fields scanned at high line number, output picture fields having a line number corresponding to the standard video signal, and in the absence of the scene motion, producing from a single picture field scanned with a high line number, output picture fields having a line number corresponding to the standard video signal, said signal processing means including one branch coupled to said scanning means for preprocessing, in the presence of scene motion, input picture fields scanned at higher line number into output picture fields of the standard line number but being free of field aliasing and moving blurr, and another preprocessing branch coupled to said scanning means for processing the first field scanned at a high line number into output picture fields having the standard line numbers, and further comprising a mixer having two inputs connected respectively to the outputs of respective preprocessing branches and a control input connected to said motion detector, said other preprocessing branch for motion pictures including storing devices for storing respective picture fields scanned with a high line number, interpolating low pass filters connected to respective storing devices, and a multiplexer connected between the interpolating low pass filters and mixer, and one preprocessing branch for still picture including a demultiplexer connected to the low pass filter, a single store for storing one of the picture fields scanned with high number of lines, and a line selector connected between the store and the mixer.

* * * * *